United States Patent
Song et al.

(10) Patent No.: US 10,629,861 B2
(45) Date of Patent: Apr. 21, 2020

(54) STRETCHABLE BATTERY AND METHOD OF MANUFACTURING THE SAME

(71) Applicants: Samsung Electronics Co., Ltd., Suwon-si, Gyeonggi-do (KR); THE BOARD OF TRUSTEES OF THE LELAND STANFORD JUNIOR UNIVERSITY, Stanford, CA (US)

(72) Inventors: Minsang Song, Suwon-si (KR); Wei Liu, Stanford, CA (US); Yi Cui, Stanford, CA (US)

(73) Assignees: SAMSUNG ELECTRONICS CO., LTD., Gyeonggi-Do (KR); THE BOARD OF TRUSTEES OF THE LELAND STANFORD JUNIOR UNIVERSITY, Stanford, CA (US)

( * ) Notice: Subject to any disclaimer, the term of this patent is extended or adjusted under 35 U.S.C. 154(b) by 0 days.

(21) Appl. No.: 15/602,152

(22) Filed: May 23, 2017

(65) Prior Publication Data
US 2018/0342756 A1 Nov. 29, 2018

(51) Int. Cl.
| | | |
|---|---|---|
| *H01M 2/02* | (2006.01) | |
| *H01M 2/16* | (2006.01) | |
| *H01M 4/04* | (2006.01) | |
| *H01M 10/04* | (2006.01) | |
| *H01M 2/14* | (2006.01) | |

(Continued)

(52) U.S. Cl.
CPC ....... *H01M 2/0275* (2013.01); *H01M 2/0207* (2013.01); *H01M 2/0267* (2013.01); *H01M 2/0287* (2013.01); *H01M 2/0292* (2013.01); *H01M 2/145* (2013.01); *H01M 2/162* (2013.01); *H01M 2/168* (2013.01); *H01M 2/1686* (2013.01); *H01M 4/0435* (2013.01); *H01M 10/0436* (2013.01); *H01M 10/0525* (2013.01); *H01M 2002/0297* (2013.01); *H01M 2004/025* (2013.01)

(58) Field of Classification Search
CPC .......... H01M 2/16; H01M 2/00; H01M 10/00
See application file for complete search history.

(56) References Cited

U.S. PATENT DOCUMENTS

| | | | | |
|---|---|---|---|---|
| 2002/0048704 A1* | 4/2002 | Murai | ................. | C09J 127/16 429/144 |
| 2003/0198871 A1* | 10/2003 | Sekino | ............. | H01M 10/0569 429/331 |

(Continued)

FOREIGN PATENT DOCUMENTS

| | | |
|---|---|---|
| KR | 1020160036339 A | 4/2016 |
| WO | 2013128068 A1 | 9/2013 |
| WO | 2016049444 A1 | 3/2016 |

OTHER PUBLICATIONS

"Wavy." dictionary.cambridge.org/us/ 2019. https://dictionary.cambridge.org/us/dictionary/english/wavy (Apr. 30, 2019). (Year: 2019).*

(Continued)

*Primary Examiner* — James Lee
(74) *Attorney, Agent, or Firm* — Cantor Colburn LLP

(57) ABSTRACT

A stretchable battery includes: a pouch; a metal barrier disposed in the pouch; and an electrode assembly disposed in the pouch and on the metal barrier, wherein the pouch and the electrode assembly each have a wavy shape including a plurality of peaks and valleys.

24 Claims, 6 Drawing Sheets

(51) Int. Cl.
*H01M 10/0525* (2010.01)
*H01M 4/02* (2006.01)

(56) References Cited

U.S. PATENT DOCUMENTS

| | | | | |
|---|---|---|---|---|
| 2011/0287295 | A1* | 11/2011 | Lappe | H01M 2/021 |
| | | | | 429/120 |
| 2013/0224557 | A1* | 8/2013 | Hayakawa | H01M 2/162 |
| | | | | 429/144 |
| 2015/0147633 | A1* | 5/2015 | Ahn | H01M 2/0237 |
| | | | | 429/176 |
| 2015/0280280 | A1 | 10/2015 | Ardebili et al. | |
| 2016/0043355 | A1* | 2/2016 | Byun | H01M 2/0207 |
| | | | | 429/163 |

OTHER PUBLICATIONS

Ren et al., "Elastic and Wearable Wire-Shaped Lithium-Ion Battery with High Electrochemical Performance**", Angewandte Communications, Angew. Chem. Int. Ed.,53, 2014, 7864-7869.
Weng et al., "A Gum-Like Lithium-Ion Battery Based on a Novel Arched Structure", Advanced Materials, 27, 2015, 1363-1369.
Xu et al., "Stretchable batteries with self-similar serpentine interconnects and integrated wireless recharging systems", Nature Communications, 2013, 1-8.

* cited by examiner

FIG. 3A
FIG. 3B
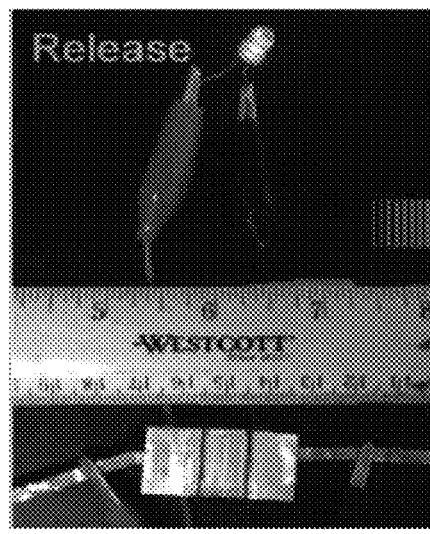
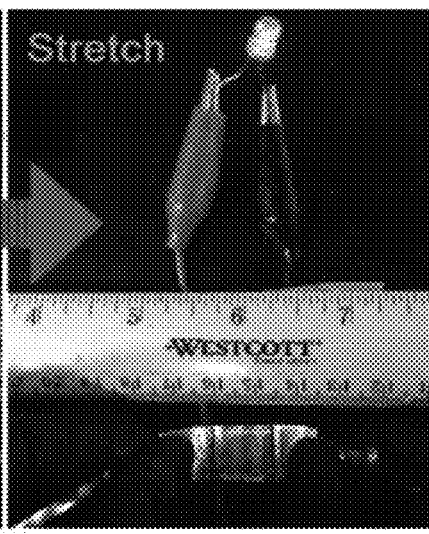
FIG. 3C
FIG. 3D
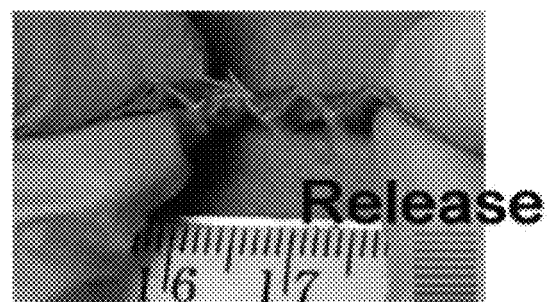
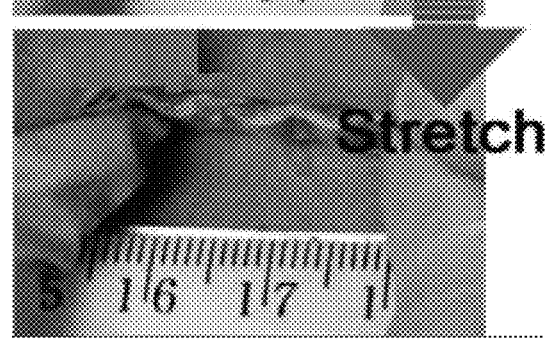

STRETCHABLE BATTERY AND METHOD OF MANUFACTURING THE SAME

BACKGROUND

1. Field

This disclosure relates to a stretchable battery and methods of manufacturing the same.

2. Description of the Related Art

With the recent attention given to wearable electronic devices, there is a growing need for shape-changeable batteries as a power source for wearable electronic devices.

Currently, rigid-type lithium batteries that are not intended to be bent, curved, or stretched have been widely used. The rigid-type lithium batteries are not suitable as power sources for wearable electronic devices.

The rigidity of the lithium batteries is caused by rigid components constituting the batteries.

Thus, there is a need for shape-changeable components for the manufacture of a shape-changeable lithium battery, and a shape-changeable lithium battery.

SUMMARY

Provided is a stretchable battery including a pouch, into which a metal barrier is inserted, and an electrode assembly, both having a wavy shape with peaks and valleys.

Provided are methods of manufacturing the stretchable battery.

Additional aspects will be set forth in part in the description which follows and, in part, will be apparent from the description, or may be learned by practice of the presented embodiments.

According to an aspect, a stretchable battery includes: a pouch; a metal barrier disposed in the pouch; and an electrode assembly disposed in the pouch, wherein the pouch and the electrode assembly each have a wavy shape including peaks and valleys.

According to another aspect, a method of manufacturing a stretchable battery includes: electrospinning a porous composite nanofiber on a support to prepare a separator; disposing the separator between a cathode and an anode; roll-pressing the cathode, the anode, and the separator to manufacture an electrode assembly; disposing the electrode assembly in a pouch including a metal barrier; sealing the pouch except for an electrolyte injection portion to manufacture a flat battery; placing the flat battery in a mold; and molding the flat battery into a wavy shape having peaks and valleys to manufacture the stretchable battery.

BRIEF DESCRIPTION OF THE DRAWINGS

These and/or other aspects will become apparent and more readily appreciated from the following description of the embodiments, taken in conjunction with the accompanying drawings in which:

FIGS. 3A and 3B are digital photographs of a stretchable lithium secondary battery prepared according to Example 1, in stretched and released states, respectively, when used as a power source for a light emitting diode, at 25° C.;

FIGS. 3C and 3D are digital photographs illustrating stretching of a stretchable lithium secondary battery prepared according to Example 1 and show the battery in the stretched and released states, respectively, at 25° C., respectively;

DETAILED DESCRIPTION

Figure 1A:
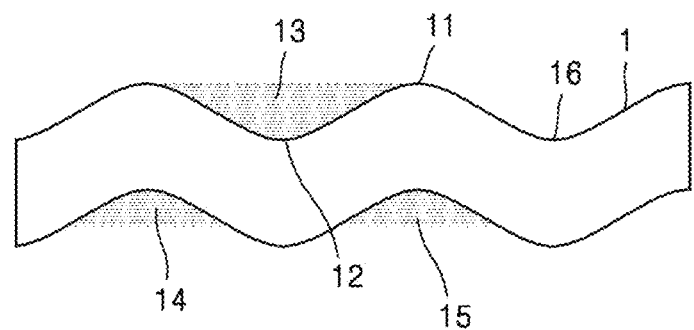
FIG. 1A is a schematic cross-sectional view of an embodiment of a stretchable lithium secondary battery.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Throughout the specification, the term "includes" in relation to an element does not preclude other elements but may further include another element, unless stated otherwise.

A C rate is a measure of a rate a battery is charged or discharged relative to its maximum capacity. A 1 C rate means a current which will discharge the entire capacity of the battery in one hour. Thus, for example, for a battery with a capacity of 100 ampere-hrs, a C rate discharge would be a discharge current of 100 amperes, a 5C rate for this battery would be 500 amperes, and a C/2 rate would be 50 amperes.

Hereinafter, a stretchable battery, and a method of manufacturing the stretchable battery, are disclosed in further detail with reference to the accompanying drawings.

There is a growing need for shape-changeable batteries as a power source for wearable electronic devices. In order to manufacture the shape-changeable batteries, there is a need for shape-changeable components.

Electrodes, separators, electrolytes, or pouches made of stretchable materials have been developed, and methods of modifying electrode structures using wires and/or a spring, such as a helical spring, have been considered to manufacture shape-changeable components.

However, these methods may complicate battery manufacturing processes, increase manufacturing costs, and may adversely affect energy density. Accordingly, there remains a need for shape-changeable battery components, which provide improved reliability and performance.

A stretchable battery according to an embodiment may include a pouch, into which a metal barrier is inserted, and an electrode assembly accommodated in the pouch, and the pouch and the electrode assembly may have a wavy, e.g., corrugated, shape with peaks and valleys.

Because the pouch and the electrode assembly have a wavy shape with peaks and valleys, the stretchable battery may have high energy density due to high electrode area utilization and a large loading amount of an electrode active material. The capacity of the stretchable battery may be maintained even in a stretched state and the battery may provide improved charge/discharge characteristics, such as improved discharge capacity, coulombic efficiency, and cycle life characteristics. Also, the stretchable battery may be more easily manufactured.

As shown in FIG. 1A, the pouch 1 may have a plurality of peaks 11 and valleys 12, and the valleys may be filled with an elastomer. A valley may be about 10% to 100%, about 20% to about 95%, or about 30% to about 90% filled with the elastomer, wherein the percent fill is determined based on the percentage of a cross-section of the pouch filled with the elastomer. In an embodiment, the elastomer may fill an entirety of the valleys. For example, in the embodiment shown in FIG. 1A, a valley 12 may be 100% filled with the elastomer 13, about 50% filled with the elastomer 14, or about 60% filled with the elastomer 15. Also, as shown by valley 16, a valley may not contain the elastomer, i.e., be 0% filled with the elastomer. In an embodiment, an average fill of the valleys with the elastomer is about 10% to 100%, about 20% to about 95%, or about 30% to about 90%. Also, in an embodiment, each valley may independently be filled about 10% to 100%, about 20% to about 95%, or about 30% to about 90% by the elastomer.

For example, the elastomer may comprise a silicon polymer, an (meth)acrylate polymer, a urethane polymer, or a combination thereof. Any of the foregoing polymers may be a copolymer, for example a urethane copolymer further comprising polyether units. As used herein, the term "silicone polymer" includes partially or fully fluorinated silicone polymers. Further as used herein, "(meth)acrylate" includes esters, e.g., (C1-C6 alkyl) esters, of acrylic or methacrylic acid. For example, the elastomer may comprise a silicon polymer, and the silicon polymer may comprise a polydimethylsiloxane, a polyphenylmethylsiloxane, a hexamethyldisiloxane, or a combination thereof. For example, the elastomer may be a polydimethylsiloxane. A combination of different elastomers can be used.

Because the elastomer has excellent elastic resilience, the stretchable battery may provide improved charge/discharge reliability, and improved discharge capacity, coulombic efficiency, and cycle life. In addition, flexibility, even after repeated stretching and releasing, is improved.

The metal barrier may comprise aluminum (Al), iron (Fe), chromium (Cr), manganese (Mn), nickel (Ni), an alloy thereof, or a combination thereof. For example, the metal barrier may comprise aluminum (Al), iron (Fe), chromium (Cr), an alloy thereof, or a combination thereof. Because moisture and an electrolyte cannot pass through the metal barrier due to high density thereof, the metal barrier may block infiltration of external moisture into the pouch and may also block leakage of the electrolyte out of the pouch.

A polymer layer may further be formed on one surface or both surfaces, e.g., opposite surfaces, of the metal barrier. For example, the polymer layer may be formed on a single surface of the metal barrier.

The polymer layer may include a polymer, and the polymer may comprise polyvinyl alcohol, polyethylene, polypropylene, urethane, polyethylene terephthalate, polyimide, nylon, or a combination thereof. For example, the polymer layer may comprise polyvinyl alcohol. The polymer layer may protect the pouch and the electrode assembly and block infiltration of moisture into the electrode assembly.

The electrode assembly may include a cathode, a separator, and an anode adhered to each other. Adhesiveness between the cathode and the separator, and between the separator and the anode, may each independently be greater than 0.1 grams-force per millimeter (gf/mm) respectively. For example, the electrode assembly may have a structure in which the cathode, the separator, and the anode are adhered and integrated, e.g., to form a unitary component.

The separator may include a porous composite nanofiber film formed on a support.

Throughout the specification, the term "composite nanofiber" refers to a nano-sized fiber, e.g., a fiber having a dimension of 1 nanometer (nm) to 100 nm, and which may be prepared using two different materials and using a predetermined device.

Examples of the support may include a metal substrate, a cellulose substrate, a cellulose/synthetic substrate, a polymeric nonwoven substrate, or a combination thereof. The metal substrate may comprise, for example, an aluminum metal foil.

The porous composite nanofiber film may have a fibrous form with a uniform average diameter from about 0.1 μm to about 3 μm, about 0.2 μm to about 2.5 μm, or about 0.4 μm to about 2 μm. The porous composite nanofiber film may have a uniform fibrous form with little beads. This may be confirmed by FIG. 2 which is further described below. If the porous composite nanofiber film is used as a separator, the stretchable battery may be more easily manufactured.

The porous composite nanofiber film may comprise at least two polymers, and the polymer may comprise polyurethane, polyether urethane, polyvinylidene fluoride, polyvinyl chloride, polyacrylonitrile, polyamide, polyimide, polyamideimide, polyether ketone, polyethylene terephthalate, polytrimethylene terephthalate, polyethylene oxide, polypropylene oxide, polystyrene, polysulfone, polyester sulfone, polyetherimide, cellulose acetate, cellulose acetate butyrate, cellulose acetate propionate, polytetrafluoroethylene, polyethylene glycol dialkyl ether, polyethylene glycol dialkyl ester, polyvinyl acetate, poly(vinylpyrrolidone-vinyl acetate), polymethyl methacrylate, or a combination thereof. Various properties desirable for a stretchable battery, such as piezoelectric properties and elastic resilience, may be satisfied by using the porous composite nanofiber film as a separator.

For example, the separator may include a porous polyurethane/polyvinylidene fluoride composite nanofiber film. For example, the separator may include a porous polyurethane/polyvinylidene fluoride composite nanofiber film prepared by electrospinning. Since the separator is configured with a composite nanofiber film including both a polyvinylidene fluoride polymer having excellent piezoelectric properties and a polyurethane polymer having excellent elastic resilience, the stretchable battery including the separator may maintain a capacity even in a state where the battery is stretched by about 50% and have excellent charge/discharge characteristics such as discharge capacity, coulombic efficiency, and cycle life characteristics.

The battery may further include a liquid electrolyte. The liquid electrolyte may include a lithium salt and an organic solvent. The liquid electrolyte may be prepared by dissolving the lithium salt in the organic solvent.

The organic solvent may comprise any suitable organic solvent in the art. For example, the organic solvent may comprise propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxirane, 4-methyldioxirane, N,N-dimethyl formamide, dimethyl acetamide, dimethylsulfoxide, dioxane, 1,2-dimethoxyethane, sulforane, dichloroethane, chlorobenzene, nitrobenzene, diethylene glycol, dimethyl ether, or a combination thereof.

The lithium salt may also comprise any suitable lithium salt in the art. For example, the lithium salt may comprise $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are natural numbers), LiCl, LiI, or a combination thereof.

The battery may have an elongation greater than about 1% to about 70%, about 2% to about 60%, or about 4% to about 50%, at 25° C. Elongation may be determined based on a length of the battery before and after elongation.

The battery may be a stretchable primary battery or secondary battery. For example, the battery may be a stretchable lithium primary battery or lithium secondary battery. For example, the battery may be a lithium secondary battery.

A method of manufacturing a stretchable battery according to another embodiment comprises preparing a separator of a porous composite nanofiber film on a support by electrospinning, manufacturing an electrode assembly by disposing the prepared porous composite nanofiber film separator between a cathode and an anode and roll-pressing the structure, manufacturing a flat battery by accommodating the prepared electrode assembly in a pouch into which a metal barrier is inserted and sealing the pouch except for an electrolyte injection portion, and manufacturing a stretchable battery by placing the prepared flat battery in a mold and molding the battery into a wavy shape having peaks and valleys.

For example, in an embodiment, the method of manufacturing a stretchable battery may comprise electrospinning a porous composite nanofiber on a support to prepare a separator; disposing the separator between a cathode and an anode; roll-pressing the cathode, the anode, and the separator to manufacturing an electrode assembly; disposing the electrode assembly in a pouch into which a metal barrier is inserted and sealing the pouch except for an electrolyte injection portion to manufacture a flat battery; placing the manufactured flat battery in a mold; and molding the battery into a wavy shape having peaks and valleys to manufacture the stretchable battery.

In an embodiment, the porous composite nanofiber film separator is first prepared on the support by electrospinning.

An electrospinning device may include a direct current (DC) power supply, a syringe pump, and a collector and be used by adjusting a nozzle size and a tip-to-collector distance (TCD) within a predetermined size or distance range. The shape of the nozzle of the electrospinning device may be classified as a side-by-side type, split type, sheath-core type, or island-in-sea type in accordance with a shape of a cross-section of the porous composite nanofiber film to be manufactured. For example, the nozzle of the electrospinning device may be a side-by-side type nozzle.

In the preparation of the separator including the porous composite nanofiber film, the porous composite nanofiber film may be included in mixture comprising at least two polymers, wherein the polymer is polyurethane, polyether urethane, polyvinylidene fluoride, polyvinyl chloride, polyacrylonitrile, polyamide, polyimide, polyamideimide, polyether ketone, polyethylene terephthalate, polytrimethylene terephthalate polyethylene oxide, polypropylene oxide, polystyrene, polysulfone, polyestersulfone, polyetherimide, cellulose acetate, cellulose acetate butyrate, cellulose acetate propionate, polytetrafluoroethylene, polyethylene glycol dialkyl ether, polyethylene glycol dialkyl ester, polyvinyl acetate, poly(vinylpyrrolidone-vinyl acetate), or polymethyl methacrylate.

A weight ratio of the mixture may be adjusted based on viscosity thereof.

In the mixture, an amount of the porous composite nanofiber may be from about 10 parts by weight to about 70 parts by weight, based on 100 parts by weight of the solvent. For example, the amount of the porous composite nanofiber may be from about 10 parts by weight to about 60 parts by weight, for example, from about 10 parts by weight to about 50 parts by weight, based on 100 parts by weight of the solvent.

The solvent may be an organic solvent such as tetrahydrofuran (THF) or dimethylformamide (DMF). However, the solvent is not limited thereto, and any organic solvent, which is suitable to dissolve the polymer mixture may be used.

When the amount of the mixture is within this range, a viscosity may be appropriately maintained so that a porous composite nanofiber film having a uniform fibrous form with little beads having an average diameter from about 0.1 μm to about 3 μm.

Next, the prepared porous composite nanofiber film separator is disposed between the cathode and the anode and roll-pressed to manufacture an electrode assembly.

For example, the cathode may be prepared as follows.

A cathode active material, a binder, and a solvent are mixed to prepare a cathode active material composition, and a conductive material may be added thereto, if desired. The cathode active material composition may be directly coated on an aluminum current collector to prepare a cathode. Alternatively, the cathode active material composition may be cast on a separate support, and a cathode active material film separated from the support and laminated on the aluminum current collector to prepare a cathode.

The cathode active material may be any suitable cathode active material in the art, without limitation. For example, a compound which provides reversible intercalation and deintercalation of lithium ions may be used therefor. For example, the compound allowing reversible intercalation and deintercalation of lithium ions may comprise a composite oxide of lithium and a metal, wherein the metal may comprise cobalt (Co), manganese (Mn), nickel (Ni), or any combination thereof. The compound allowing reversible intercalation and deintercalation of lithium ions may be a compound represented by any of the following formulae: $Li_aA_{1-b}B'_bD_2$ (where $0.90 \leq a \leq 1.8$, and $0 \leq b \leq 0.5$); $Li_a E_{1-b}B'_bO_{2-c}D_c$ (where $0.90 \leq a \leq 1.8$, $0 \leq b \leq 0.5$, $0 \leq c \leq 0.05$); $LiE_{2-b}B'_bO_{4-c}D_c$ (where $0 \leq b \leq 0.5$ and $0 \leq c \leq 0.05$); $Li_a Ni_{1-b-c}Co_bB'_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (where $0.90 \leq a \leq 1.8$, $0 \leq b \leq 0.5$, $0 \leq c \leq 0.05$, and $0 < \alpha < 2$); $Li_aNi_{1-b-c}Co_bB'_cO_{2-\alpha}F'_2$ (where $0.90 \leq a \leq 1.8$, $0 \leq b \leq 0.5$, $0 \leq c \leq 0.05$, and $0 < \alpha < 2$); $Li_aNi_{1-b-c}Mn_bB'_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB'_cO_{2-\alpha}F'_2$ (where $0.90 \leq a \leq 1.8$, $0 \leq b \leq 0.5$, $0 \leq c \leq 0.05$, and $0 < \alpha < 2$); $Li_aNi_bE_cG_dO_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_dG_eO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$ and $0.001 \leq b \leq 0.1$); $Li_aCoG_bO_2$ (where $0.90 \leq a \leq 1.8$ and $0.001 \leq b \leq 0.1$); $Li_aMnG_bO_2$ (where $0.90 \leq a \leq 1.8$ and $0.001 \leq b \leq 0.1$); $Li_aMn_2G_bO_4$ (where $0.90 \leq a \leq 1.8$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the formulae above, A is Ni, Co, Mn, or any combination thereof; B' is Al, Ni, Co, Mn, Cr, Fe, Mg, Sr, V, a rare earth element, or a combination thereof; D' is O, F, S, P, or a combination thereof; E is Co, Mn, or any combination thereof; F' is F, S, P, or a combination thereof; G is Al, Cr, Mn, Fe, Mg, La, Ce, Sr, V, or a combination thereof; Q is Ti, Mo, Mn, or a combination thereof; I' is Cr, V, Fe, Sc, Y, or a combination thereof; and J is V, Cr, Mn, Co, Ni, Cu, or a combination thereof.

The compounds listed above may have a coating layer on the surface thereof or a mixture of a compound with no coating layer and a compound having a coating layer may also be used. The coating layer may include a compound of a coating element, such as an oxide, hydroxide, oxyhydroxide, oxycarbonate, or hydroxycarbonate of the coating element. The compound constituting the coating layer may be amorphous or crystalline. Examples of the coating element contained in the coating layer may be Mg, Al, Co, K, Na, Ca, Si, Ti, V, Sn, Ge, Ga, B, As, Zr, or a combination thereof. The coating layer may be formed on the compound by using the coating element by any suitable method, such as a method which does not adversely affect physical properties of the cathode active material (e.g., spray coating and immersing). These methods are known to those of skill in the art, details of which can be determined without undue experimentation, and thus further description thereof it is omitted for clarity.

For example, the cathode active material may include $Li_{1+x}(M)_{1-x}O_2$ (where $0.05 \leq x \leq 0.2$), where M may be a transition metal. For example, M may be Ni, Co, Mn, Fe, Ti, a combination thereof. For example, the cathode active material may include $LiMn_2O_4$, $LiNi_2O_4$, $LiCoO_2$, $LiNiO_2$, $LiMnO_2$, $Li_2MnO_3$, $LiFePO_4$, or $LiNi_xCo_yO_2$ (where $0<x\leq0.15$ and $0<y\leq0.85$).

The binder may comprise polyacrylate (PAA), lithium polyacrylate (LiPAA), a vinylidene fluoride/hexafluoropropylene copolymer, polyvinylidene fluoride, polyacrylonitrile, polymethyl methacrylate, polytetrafluoroethylene (PTFE), a styrene butadiene rubber polymer, or a combination thereof.

The solvent may comprise N-methylpyrrolidone (NMP), acetone, water, or a combination thereof. However, the solvent is not limited thereto and any suitable solvent in the art may also be used.

The conductive material may comprise carbon black, graphite particulate, natural graphite, artificial graphite, acetylene black, Ketjen black, carbon fiber, carbon nanotube, a metal such as copper, nickel, aluminum, silver, or a combination thereof, or a conductive polymer such as a polyphenylene derivative, or a combination thereof, each of which may be used in powder, fiber, or tube form; and s. However, the conductive material is not limited thereto, and any suitable material in the art may be used.

The amount of the cathode active material, the binder, the conductive material, and the solvent may be that used in the art in the manufacture of lithium secondary batteries. At least one of the binder, the conductive material, and the solvent may be omitted according to the use and the structure of the lithium secondary battery. Details with respect to the manufacture of the lithium secondary battery, such as amounts of the cathode active material, the binder, and the conductive material may be determined by one of skill in the art without undue experimentation.

The cathode current collector may have a thickness of about 3 micrometers (μm) to about 500 μm. The cathode current collector may be any suitable current collector, such as a current collector that does not cause a chemical change in a fabricated battery and has suitable conductivity. Examples of the cathode current collector include copper, stainless steel, aluminum, nickel, titanium, calcined carbon, copper, or stainless steel surface-treated with carbon, nickel, titanium, or silver, an aluminum-cadmium alloy, or a combination thereof. In addition, the cathode current collector may be processed to have fine irregularities, such as a surface texture, on the surface thereof so as to enhance adhesiveness of the cathode current collector to the cathode active material, and may be used in any of various forms including film, sheet, foil, net, porous, foam, or non-woven form. A combination thereof may be used.

A mixture for the cathode may have a density of 2 grams per cubic centimeter (g/cc) or greater, such as a density of about 2 g/cc to about 5 g/cc.

The anode may be prepared in the same manner as the cathode, except that an anode active material is used instead of the cathode active material.

For example, the anode may be prepared as follows.

An anode active material, a binder, and a solvent are mixed to prepare an anode active material composition. The anode active material composition may further include a conductive material, if desired. The anode may be prepared by forming an anode active material layer by directly coating the anode active material composition on a copper current collector and drying the coating. Alternatively, the anode may be prepared by forming an anode active material by casting the anode active material composition on a separate support, and laminating a film separated from the support on the copper current collector.

The anode active material may comprise any suitable active material in the art in the manufacture of the anode and allowing intercalation and deintercalation of lithium. For example, the anode active material may comprise lithium metal, a metal alloyable with lithium, a transition metal oxide, a non-transition metal oxide, a carbonaceous material, or a combination thereof.

For example, the metal alloyable with lithium may comprise Si, Sn, Al, Ge, Pb, Bi, Sb, an Si—Y' alloy (where Y' is an alkali metal, alkali earth metal, a Group XIII element, a Group XIV element, transition metal, a rare earth element, or a combination thereof (except for Si), an Sn—Y' alloy (where Y' is an alkali metal, alkali earth metal, a Group XIII element, a Group XIV element, transition metal, rare earth element, or a combination thereof (except for Sn)). In this regard, Y' may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, or a combination thereof.

For example, the transition metal oxide may be lithium titanium oxide, vanadium oxide, lithium vanadium oxide, or a combination thereof.

For example, the non-transition metal oxide may be $SnO_2$, $SiO_x$ (where $0<x<2$), or a combination thereof.

The carbonaceous material may include crystalline carbon, amorphous carbon, or a combination thereof. Examples of the crystalline carbon include natural graphite or artificial graphite. The crystalline carbon may have any suitable shape, such as a plate, flake, spherical, or fibrous form, or a combination thereof. Examples of the amorphous carbon include soft carbon (carbon calcined at low temperature), hard carbon, mesophase pitch carbides, calcined corks, and the like.

The conductive material, the binder, and the solvent of the anode active material composition may be the same as those used in the cathode active material composition.

If desired, a plasticizer may further be added to the anode active material composition to form pores in the anode plate. The anode active material, the binder, the solvent, and the conductive material may be used in amounts suitable for a lithium secondary battery, the details of which can be determined by one of skill in the art without undue experimentation.

The anode current collector may have a thickness of about 3 μm to about 500 μm. The anode current collector may be any suitable current collector, such as a current collector that does not cause a chemical change in a fabricated battery and has suitable conductivity without limitation. Examples of the anode current collector may include copper, stainless steel, aluminum, nickel, titanium, calcined carbon, copper or stainless steel surface-treated with carbon, nickel, titanium, or silver, or a combination thereof, an aluminum-cadmium alloy, or a combination thereof. In addition, the anode current collector may be processed to have fine irregularities, e.g., a surface texture, on the surface thereof so as to enhance adhesiveness of the cathode current collector to the anode active material, and may be used in any of various forms including film, sheet, foil, net, porous, foam, and non-woven form. A combination comprising at least one of the foregoing may be used.

In the preparation of the electrode assembly, the roll-pressing may be performed by hot rolling at a temperature from about 40° C. to about 90° C., about 45° C. to about 85° C., or about 50° C. to about 80° C. By the hot rolling, the cathode, the separator, and the anode of the electrode assembly may be adhered to each other. Adhesiveness between the cathode and the separator and between the separator and the anode may be greater than about 0.1 gf/mm, respectively, such as about 0.1 gf/mm to about 5 gf/mm, about 0.2 gf/mm to about 4 gf/mm, or about 0.3 gf/mm to about 3 gf/mm. The electrode assembly may have a structure in which the cathode, the separator, and the anode are adhered and integrated.

Then, the manufactured electrode assembly is accommodated in a pouch into which a metal barrier is inserted and the pouch is sealed except for an electrolyte injection portion to manufacture a flat battery. The types of the metal barrier may be as described above, and thus further detailed description thereof is omitted for clarity. Any suitable sealing method used in the art may be applied thereto to seal the pouch.

Then, the manufactured flat battery is placed in a mold and the battery is molded into a wavy shape having peaks and valleys to prepare a stretchable battery.

The manufacture of the stretchable battery may further include injecting a liquid electrolyte through the electrolyte injection portion after molding the flat battery into the wavy shape with peaks and valleys. The types of the liquid electrolyte are as described above and thus further description thereof it is omitted for clarity.

The method may further include forming a polymer layer by coating a surface of the pouch with a polymer after manufacturing the stretchable battery. The polymer may comprise polyvinyl alcohol, polyethylene, polypropylene, urethane, polyethylene terephthalate, polyimide, nylon, or a combination thereof. For example, the polymer layer may include polyvinyl alcohol. The polymer layer may protect the pouch and the electrode assembly and prevent infiltration of moisture into the electrode assembly.

The method may further include filling the valleys with an elastomer and curing the elastomer after forming the polymer layer. For example, the elastomer may comprise a silicon polymer, and the silicon polymer may comprise polydimethylsiloxane, polyphenylmethylsiloxane, hexamethyldisiloxane, or a combination thereof. For example, the elastomer may be polydimethylsiloxane.

Because the elastomer has improved elastic resilience, the stretchable battery may provide improved reliability of charge/discharge characteristics, such as improved discharge capacity, coulombic efficiency, and cycle life characteristics, as well as improved flexibility even, after repeated stretching and releasing.

Figure 1B:
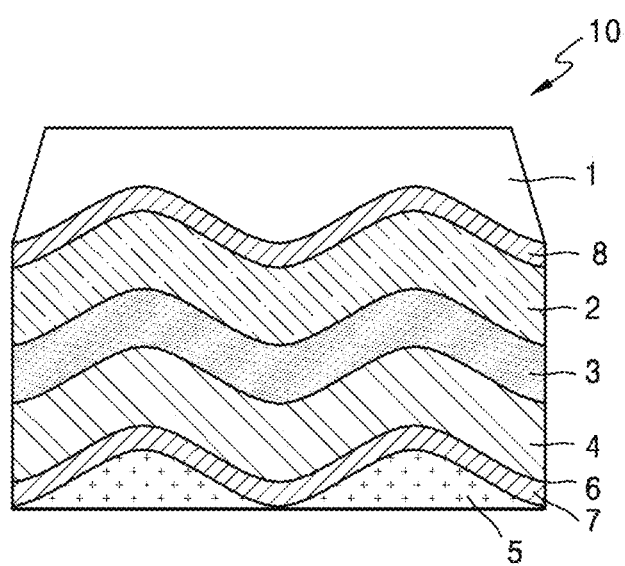
FIG. 1B is a schematic cross-sectional view of another embodiment of a stretchable lithium secondary battery.

FIG. 1B is a schematic cross-sectional view of an embodiment of a stretchable lithium secondary battery 10.

As illustrated in FIG. 1B, the stretchable lithium secondary battery 10 may include a pouch 1, and an electrode assembly disposed in, e.g., accommodated in, the pouch 1 and including a cathode (e.g., LiCoO$_2$) 2, a separator including a porous polyurethane/polyvinylidene fluoride film 3, and an anode (e.g., graphite) 4 adhered therein. Both the pouch 1 and the electrode assembly have a wavy shape with peaks and valleys, and the valleys are filled with an elastomer 5 (e.g., polydimethylsiloxane). Also shown in FIG. 1B is a first metal barrier 6, which is disposed between the anode 4 and a lower surface 7 of the pouch 1, and a second metal barrier 8, which is disposed between the cathode 2 and an upper surface of the pouch 1. If desired, the first metal barrier 6 or the second metal barrier may be omitted.

The stretchable lithium secondary battery 10 provides improved energy density, the capacity is maintained even in a stretched state, and provides improved charge/discharge characteristics, such as discharge capacity, coulombic efficiency, and cycle lifespan characteristics. Also, the stretchable lithium secondary battery 10 may be more easily manufactured.

The stretchable lithium secondary battery 10 may be used as a power source for wearable electronic devices and also as a secondary battery having various shape-changeable uses, an may be applicable to electric bicycles, notebook computers, smart watches, smartphones, and electric vehicles.

Hereinafter, an embodiment is disclosed in further detail with reference to the following examples and comparative examples. However, these examples shall not limit the purpose and scope of the disclosed embodiment.

EXAMPLES

Example 1: Manufacture of Stretchable Lithium Secondary Battery 10 parts by weight of a mixture of polyurethane powder and polyvinylidene fluoride powder (in a weight ratio of 1:1) was dissolved in 100 parts by weight of a mixed solvent including tetrahydrofuran and dimethyl formamide (in a volume ratio of 1:1) to prepared a solution. 1 milliliter (mL) of the prepared solution was added to a 1 mL plastic capillary and electrospinning was performed using a side-by-side type spinning nozzle at a voltage of 15 kilovolts (kV) to obtain a porous polyurethane/polyvinylidene fluoride film on an aluminum foil. The obtained porous polyurethane/polyvinylidene fluoride film was dried in a vacuum at 50° C. for 12 hours to prepare a porous polyurethane/polyvinylidene fluoride film separator.

The prepared porous polyurethane/polyvinylidene fluoride film separator was disposed between an LiCoO$_2$ cathode (20 millimeters (mm)×10 mm, manufactured by Samsung SDI, Co., Ltd.) and a graphite anode (21 mm×11 mm, manufactured by Samsung SDI, Co., Ltd.) and hot roll-pressed at 60° C. to manufacture an electrode assembly in which the cathode, the separator, and the anode were adhered to each other.

The manufactured electrode assembly was accommodated in a pouch into which an aluminum (Al) barrier is inserted, and the pouch was sealed except for an electrolyte injection portion to manufacture a flat full cell.

The manufactured flat full cell was placed in a plastic mold and molded into a wavy shape having a plurality of peaks and valleys, and a liquid electrolyte prepared by dissolving 1 molar (M) LiPF$_6$ in a mixed solvent of ethylene carbonate and diethylene carbonate (in a weight ratio of 1:1) was injected through the electrolyte injection portion to manufacture a stretchable full cell.

Then, polyvinyl alcohol was coated on the surface of the pouch into which the Al barrier is inserted to a predetermined thickness to form a polyvinyl alcohol layer. Then, a polydimethylsiloxane liquid (Sylgard 184, including a silicon elastomer and a curing agent in a weight ratio of 10:1, manufactured by Dow Corning, Co., Ltd.) was filled in the plurality of valleys and cured at room temperature for 12 hours to manufacture a stretchable full cell.

Example 2: Manufacture of Stretchable Lithium Secondary Battery

Figure 4A:
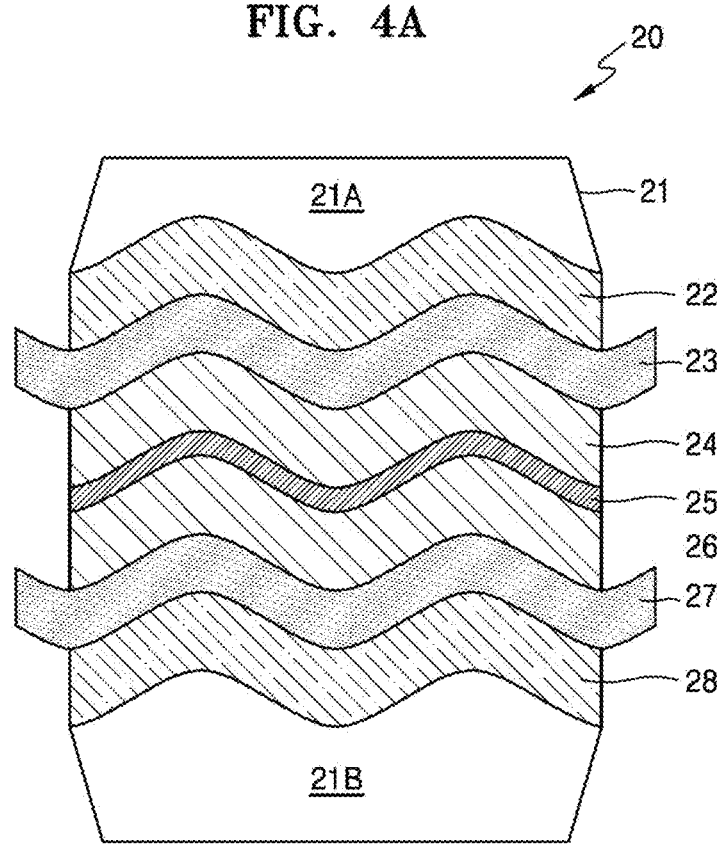
FIG. 4A is a schematic cross-sectional view of a stretchable lithium secondary battery prepared according to Example 2.

A stretchable full cell was manufactured in the same manner as in Example 1, except that two electrode assemblies in which the cathodes, the separators, and the anodes are adhered to both sides of the Al foil were prepared by disposing two porous polyurethane/polyvinylidene fluoride film separators between two $LiCoO_2$ cathodes (20 mm×10 mm, manufactured by Samsung SDI, Co., Ltd.) coated on both surfaces of an Al foil and two graphite anodes (21 mm×11 mm, manufactured by Samsung SDI, Co., Ltd.), respectively and hot roll-pressing the structure at 60° C. to manufacture two. In this case, a schematic cross-sectional view of the stretchable full cell 20 is illustrated in FIG. 4A.

Comparative Example 1: Manufacture of Stretchable Lithium Secondary Battery

A stretchable full cell was prepared in the same manner as in Example 1, except that a porous polyethylene separator (manufactured by Celgard, Co., Ltd.) was used instead of the porous polyurethane/polyvinylidene fluoride film separator.

Comparative Example 2: Manufacture of Flat Lithium Secondary Battery 10 parts by weight of a mixture of polyurethane powder and polyvinylidene fluoride powder (in a weight ratio of 1:1) was dissolved in 100 parts by weight of a mixed solvent including tetrahydrofuran and dimethyl formamide (in a volume ratio of 1:1) to prepared a mixture solution. 1 mL of the prepared solution was added to a 1 mL plastic capillary and electrospinning was performed using a side-by-side type spinning nozzle at a voltage of 15 kV to obtain a porous polyurethane/polyvinylidene fluoride film. The obtained porous polyurethane/polyvinylidene fluoride film was dried in a vacuum at 50° C. for 12 hours to prepare a porous polyurethane/polyvinylidene fluoride film separator.

The prepared porous polyurethane/polyvinylidene fluoride film separator was disposed between an $LiCoO_2$ cathode (20 mm×10 mm, manufactured by Samsung SDI, Co., Ltd.) and a graphite anode (21 mm×11 mm, manufactured by Samsung SDI, Co., Ltd.) and hot roll-pressed at 60° C. to prepare an electrode assembly in which the cathode, the separator, and the anode were adhered to each other The manufactured electrode assembly was accommodated in a pouch into which an aluminum (Al) barrier is inserted, and the pouch was sealed except for an electrolyte injection portion to manufacture a flat full cell.

Analysis Example 1: Scanning Electron Microscope (SEM) Image Analysis

An SEM image of the porous polyurethane/polyvinylidene fluoride film separator of the stretchable lithium secondary battery prepared according to Example 1 was analyzed. The SEM analysis was performed using FEI XL30 Sirion SEM. The results are shown in FIG. 2.

Figure 2:
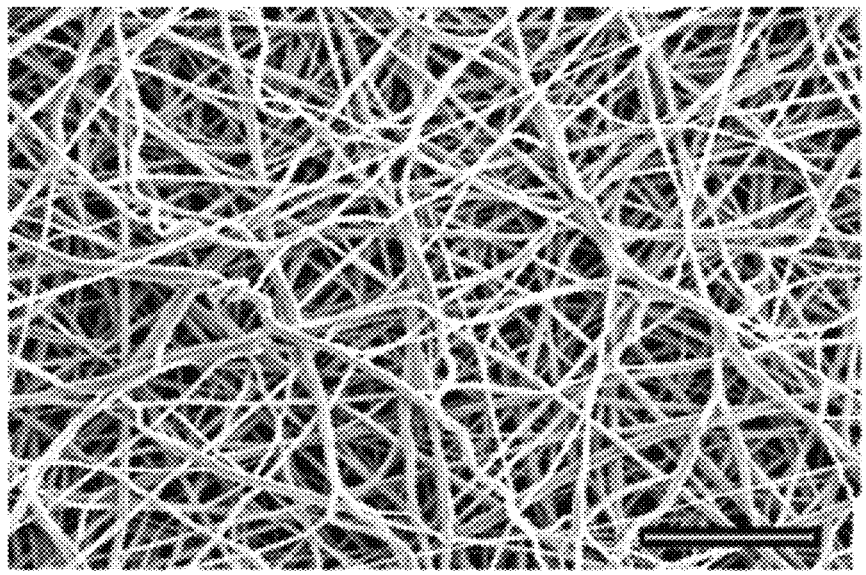
FIG. 2 is a scanning electron microscopic (SEM) image of a porous polyurethane/polyvinylidene fluoride film separator of a stretchable lithium secondary battery prepared according to Example 1.

Referring to FIG. 2, the porous polyurethane/polyvinylidene fluoride film separator of the stretchable lithium secondary battery manufactured according to Example 1 had little beads and a fibrous form with a uniform average particle diameter from about 0.1 micrometers (μm) to about 3 μm.

Evaluation Example 1: Measurement of Elongation

The stretchable lithium secondary battery manufactured according to Example 1 was used as a power source of a light emitting diode in both stretched and released states at 25° C. and digital photographs thereof are shown in FIGS. 3A and 3B.

Referring to FIGS. 3A and 3B, the light emitting diode was turned on by the stretchable lithium secondary battery manufactured according to Example 1 both in the stretched and released states. Thus, it may be confirmed that the stretchable lithium secondary battery may be used as a power source of the light emitting diode. Also, it may be confirmed that the stretchable lithium secondary battery manufactured according to Example 1 is stretchable by up to 50% when measured at 25° C. using a bar ruler.

Evaluation Example 2: Evaluation of Adhesiveness

Adhesiveness between the cathode and the separator and between the separator and the anode of the stretchable lithium secondary batteries manufactured according to Example 1 and Comparative Example 1 were evaluated respectively. The results are shown in Table 1 below.

A double-sided tape (3M) having a size of 26 mm×26 mm was attached to one surface of a slide glass having a size of 26 mm×76 mm and a thickness of 1 to 2 mm and one end of the cathode or anode having a size of 25 mm×100 mm was attached thereto. Then, the slide glass and the cathode or anode were pulled to the opposite sides by using an Instron 3342 device at a speed of 100 millimeters per minute (mm/min) and a weight of 50 kilograms-force (kgf) to measure adhesiveness therebetween.

TABLE 1

| | Adhesiveness between cathode and separator (gf/mm) | Adhesiveness between separator and anode (gf/mm) |
|---|---|---|
| Example 1 | 2.10 | 1.50 |
| Comparative Example 1 | 0 | 0 |

In Table 1, the units of adhesiveness are grams-force per millimeter (gf/mm).

Referring to Table 1, it may be confirmed that adhesiveness of the stretchable lithium secondary battery manufactured according to Example 1 between the cathode and the separator and between the separator and the anode were greater than those of the stretchable lithium secondary battery manufactured according to Comparative Example 1.

Evaluation Example 3: Evaluation of Energy Density and Charge/discharge Characteristics Charging and discharging tests were performed using a 96-channel battery tester, and a C-rate was calculated based on a theoretical capacity of $LiCoO_2$ (150 mAh/g).

(1) Evaluation of Energy Density

The stretchable lithium secondary batteries manufactured according to Examples 1 and 2 and the flat lithium secondary battery manufactured according to Comparative Example 2 were tested under standard charge/discharge conditions at 25° C. in a charging and discharging voltage range of 2.5 V to 4.2 V (vs. Li/Li$^+$).

Figure 4B:
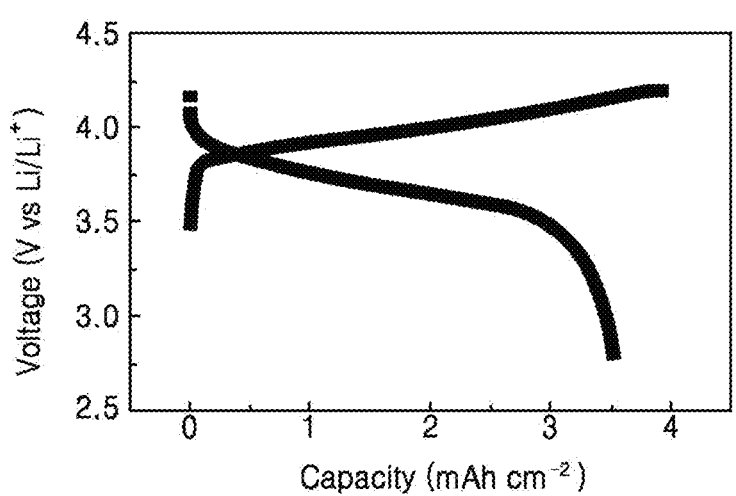
FIG. 4B is a graph of voltage (volts versus $Li/Li^+$) with respect to capacity (milliampere-hours per square centimeter, $mAh \cdot cm^{-2}$) showing results for a stretchable lithium secondary battery prepared according to Example 1 tested under charging and discharging conditions of a constant current rate of 0.25 C and a charging and discharging voltage range of 2.5 V to 4.2 V (vs. $Li/Li^+$)

Next, the batteries were charged at a constant current rate of 0.25 C until the voltage reached 4.2 V at 25° C. Then, the batteries were discharged at a constant current rate of 0.25 C until the voltage reached 2.5 V to measure an initial charge/discharge capacity (1$^{st}$ cycle). The charging and discharging test results of the stretchable lithium secondary battery manufactured according to Example 2 are shown in FIG. 4B. Energy density (watt-hours per liter, Wh/L) was calculated using Equation 1 below referring to FIG. 4 B.

$$\text{Energy density (Wh/L)} = [\{\text{Discharge capacity (mAh)} \times \text{voltage (V)}/\text{Volume of battery (width} \times \text{length} \times \text{thickness})\} \times 1000] \quad \text{Equation 1}$$

The energy density of each of the lithium secondary batteries manufactured according to Examples 1 and 2 are shown in Table 2 below.

TABLE 2

| | Number of cathode/separator/anode unit | Energy density (Wh/L) |
|---|---|---|
| Example 1 | 1 | 55 |
| Example 2 | 2 | 86 |

Referring to Table 2, it may be confirmed that energy density of the stretchable lithium secondary batteries manufactured according to Examples 1 and 2 increases as the numbers of the cathodes and anodes is increased.

(2) Evaluation of Charge/discharge Characteristics 1

The stretchable lithium secondary batteries manufactured according to Comparative Example 1 and Example 1 were tested under standard charge/discharge conditions at 25° C. in a charging and discharging voltage range of 2.5 V to 4.2 V (vs. Li/Li$^+$).

Next, the batteries were charged at a constant current rate of 0.25 C until the voltage reached 4.2 V at 25° C. Then, the batteries were discharged at a constant current rate of 0.25 C until the voltage reached 2.5 V to measure an initial charge/discharge capacity (1$^{st}$ cycle). The charging and discharging were repeated until 5$^{th}$ cycle to measure discharge capacities (1$^{st}$ to 5$^{th}$ cycles).

Then, the batteries were charged at a constant current rate of 0.5 C until the voltage reached 4.2 V. Then, the batteries were discharged at a constant current rate of 0.5 C until the voltage reached 2.5 V to measure a discharge capacity (6$^{th}$ cycle), and the charging and discharging were repeated until 10$^{th}$ cycle to measure discharge capacities (6$^{th}$ to 10$^{th}$ cycles).

Then, the batteries were charged at a constant current rate of 0.75 C until the voltage reached 4.2 V. Then, the batteries were discharged at a constant current rate of 0.75 C until the voltage reached 2.5 V to measure an initial charge/discharge capacity (11$^{th}$ cycle). The charging and discharging were repeated until 15$^{th}$ cycle to measure discharge capacities (11$^{th}$ to 15$^{th}$ cycles).

Then, the batteries were charged at a constant current rate of 1.0 C until the voltage reached 4.2 V. Then, the batteries were discharged at a constant current rate of 1.0 C until the voltage reached 2.5 V to measure a discharge capacity (16$^{th}$ cycle). The charging and discharging were repeated until 20$^{th}$ cycle to measure discharge capacities (16$^{th}$ to 20$^{th}$ cycles).

Then, the batteries were charged at a constant current rate of 0.5 C until the voltage reached 4.2 V. Then, the batteries were discharged at a constant current rate of 0.5 C until the voltage reached 2.5 V to measure a discharge capacity (21$^{st}$ cycle). The charging and discharging were repeated until 36$^{th}$ cycle to measure discharge capacities (21$^{st}$ to 36$^{th}$ cycles). The results are shown in FIGS. 5A and 5B, respectively.

Figure 5A:
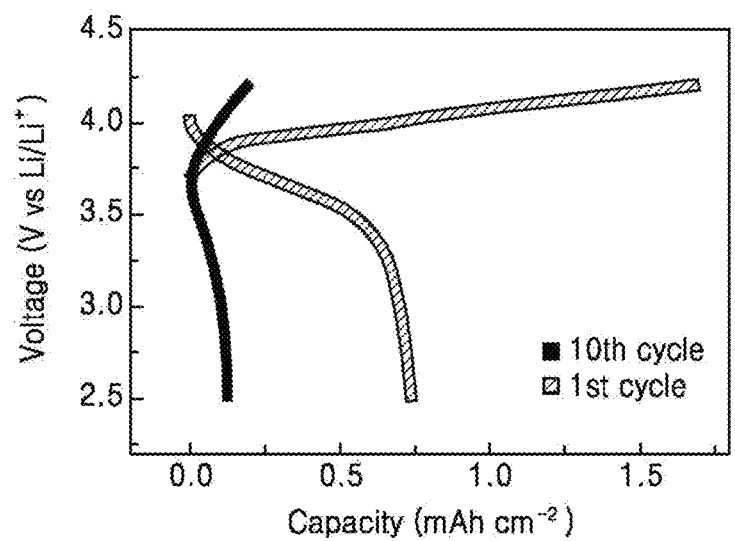
FIG. 5A is a graph of voltage (volts versus $Li/Li^+$) with respect to capacity (milliampere hours per square centimeter, $mAh \cdot cm^{-2}$) showing results for a stretchable lithium secondary battery prepared according to Comparative Example 1 at the $1^{st}$ and $10^{th}$ cycles of charging and discharging tests.
Figure 5B:
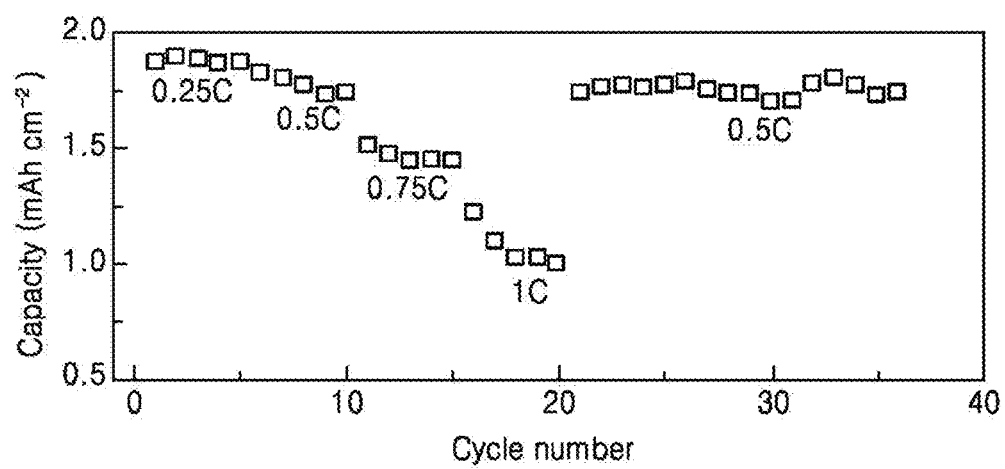
FIG. 5B is a graph of capacity (milliampere hours per square centimeter, $mAh \cdot cm^{-2}$) versus cycle number showing the results of charging and discharging tests of a stretchable lithium secondary battery prepared according to Example 1 performed at a constant current rates of 0.25 C ($1^{st}$ to $5^{th}$ cycles), 0.5 C ($6^{th}$ to $10^{th}$ cycles), 0.75 C ($11^{th}$ to $15^{th}$ cycles), 1.0 C ($16^{th}$ to $20^{th}$ cycles), and 0.5 C ($21^{st}$ to $36^{th}$ cycles) and in a charging and discharging voltage range of 2.5 V to 4.2 V (vs. $Li/Li^+$) to evaluate cycle lifespan characteristics.

Referring to FIGS. 5A and 5B, the stretchable lithium secondary battery manufactured according to Comparative Example 1 provided a lower initial discharge capacity than that of the stretchable lithium secondary battery prepared at Example 1 by 64.3%.

In addition, the stretchable lithium secondary battery manufactured according to Comparative Example 1 had a cycle capacity retention ratio of 16.7% at the 10$^{th}$ cycle [(discharge capacity at 10$^{th}$ cycle/discharge capacity at 1$^{st}$ cycle)×100%], and the stretchable lithium secondary battery manufactured according to Example 1 had a cycle capacity retention ratio of 85.2% at 36$^{th}$ cycle [(discharge capacity at 36$^{th}$ cycle/discharge capacity at 1$^{st}$ cycle)×100%].

Thus, it may be confirmed that the stretchable lithium secondary battery manufactured according to Example 1 had better initial discharge capacity and cycle lifespan characteristics than the stretchable lithium secondary battery manufactured according to Comparative Example 1.

(3) Evaluation 2 of Charge/discharge Characteristics

The stretchable lithium secondary battery manufactured according to Example 1 was tested under standard charge/discharge conditions at 25° C. in a charging and discharging voltage range of 2.5 V to 4.2 V (vs. Li/Li$^+$).

The battery was charged at a constant current rate of 0.5 C until the voltage reached 4.2 V at 25° C. in stretched and released states respectively. Then, the battery was discharged at a constant current rate of 0.5 C until the voltage reached 2.5 V to measure initial discharge capacity (1$^{st}$ cycle). The results are shown in FIG. 6A and Table 3 below.

TABLE 3

| | Discharge capacity (mAh/cm$^{-2}$) |
|---|---|
| Example 1 (stretched state) | 2.25 |
| Example 1 (released state) | 2.08 |

Figure 6A:
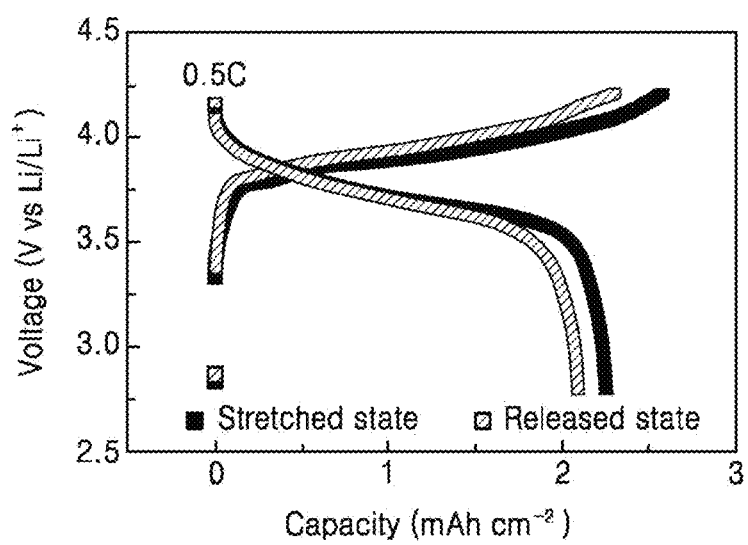
FIG. 6A is a graph of voltage (volts vs. $Li/Li^+$) with respect to capacity (milliampere hours per square centimeter, $mAh \cdot cm^{-2}$) for a stretchable lithium secondary battery prepared according to Example 1 and tested under charging and discharging conditions of 25° C., a constant current rate of 0.5 C, and a charging and discharging voltage range of 2.5 V to 4.2 V (vs. $Li/Li^+$) in stretched and released states.

Referring to FIG. 6A and Table 3, it may be confirmed that capacity of the stretchable lithium secondary battery manufactured according to Example 1 was stably maintained even in the stretched state with a capacity variation of less than 10%.

Figure 6B:
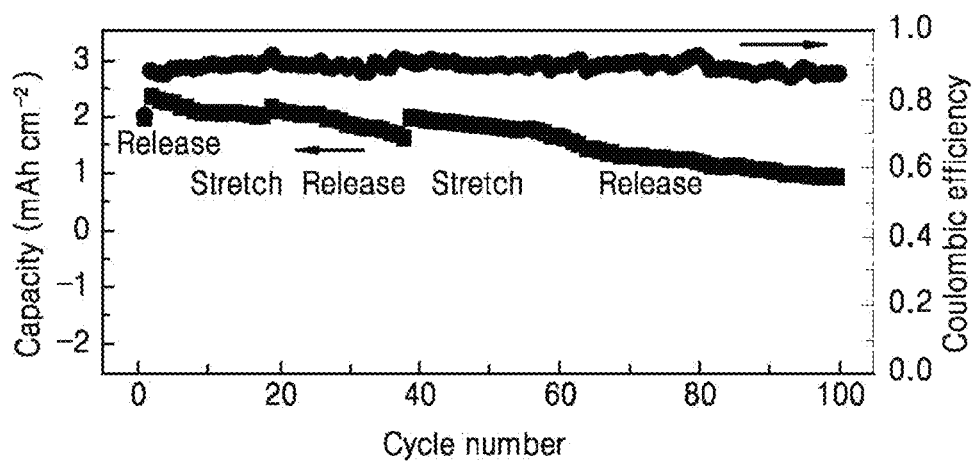
FIG. 6B is a graph of capacity (milliampere hours per square centimeter, $mAh \cdot cm^{-2}$) versus cycle number illustrating the results of charging and discharging tests of a stretchable lithium secondary battery prepared according to Example 1 performed at 25° C., a constant current rates of 0.5 C and in a charging and discharging voltage range of 2.5 V to 4.2 V (vs. $Li/Li^+$) by alternating 20 cycles in the stretched state and 20 cycles in the released state until the $100^{th}$ cycle.

Then, this charging and discharging process was repeated, alternating 20 cycles in the stretched state and 20 cycles in the released state until the 100$^{th}$ cycle, and coulombic efficiency and cycle lifespan characteristics were evaluated. The results are shown in FIG. 6B and Table 4 below. In Table 4, coulombic efficiency (%) and cycle capacity retention ratio (%) are calculated using Equations 2 and 3 below respectively.

$$\text{Coulombic efficiency (\%)} = [(\text{discharge capacity at } 100^{th} \text{ cycle}/\text{charge capacity at } 100^{th} \text{ cycle}) \times 100\%] \quad \text{Equation 2}$$

$$\text{Cycle capacity retention ratio (\%)} = [(\text{discharge capacity at } 100^{th} \text{ cycle}/\text{discharge capacity at } 1^{st} \text{ cycle}) \times 100\%] \quad \text{Equation 3}$$

TABLE 4

| | Coulombic efficiency (%) | Cycle capacity retention (%) |
|---|---|---|
| Example 1 | 85.6 | 50 |

Referring to FIG. 6B and Table 4, it may be confirmed that the stretchable lithium secondary battery manufactured according to Example 1 is stable and has excellent Coulombic efficiency (%) and high cycle capacity retention (%) even after repeated stretched and released states.

In the stretchable battery according to an embodiment, both the pouch and the electrode assembly may have wavy shapes with peaks and valleys. The stretchable battery has a high elongation of about 50% and high energy density. The stretchable battery may have capacity stably maintained in the stretched state and excellent charge/discharge characteristics such as discharge capacity, Coulombic efficiency, and cycle lifespan characteristics. In addition, the stretchable battery may be easily manufactured.

It should be understood that embodiments described herein should be considered in a descriptive sense only and not for purposes of limitation. Descriptions of features, advantages, or aspects within each embodiment should be considered as available for other similar features, advantages, or aspects in other embodiments.

While an embodiment has been described with reference to the figures, it will be understood by those of ordinary skill in the art that various changes in form and details may be made therein without departing from the spirit and scope as defined by the following claims.

What is claimed is:

1. A stretchable battery comprising:
   a pouch;
   a metal barrier disposed in the pouch; and
   an electrode assembly disposed in the pouch,
   wherein the pouch has a wavy shape comprising a plurality of peaks and a plurality of valleys and the electrode assembly has a wavy shape comprising a plurality of peaks and a plurality of valleys, and
   further comprising an elastomer, wherein the elastomer is disposed in and fills a valley of the plurality of valleys of the pouch.

2. The stretchable battery of claim 1, wherein the elastomer comprises a silicon polymer, a (meth)acrylate polymer, a urethane polymer, or a combination thereof.

3. The stretchable battery of claim 1, wherein the elastomer comprises polydimethylsiloxane, polyphenylmethylsiloxane, hexamethyldisiloxane, or a combination thereof.

4. The stretchable battery of claim 1, wherein the metal barrier comprises aluminum, iron, chromium, manganese, nickel, an alloy thereof, or a combination thereof.

5. The stretchable battery of claim 1, further comprising a polymer layer, which is disposed on a single surface or on opposite surfaces of the metal barrier.

6. The stretchable battery of claim 5, wherein the polymer layer comprises polyvinyl alcohol, polyethylene, polypropylene, urethane, polyethylene terephthalate, polyimide, nylon, or a combination thereof.

7. The stretchable battery of claim 1, wherein the electrode assembly comprises a cathode, a separator, and an anode, which are adhered to each other.

8. The stretchable battery of claim 7, wherein an adhesiveness between the cathode and the separator and between the separator and the anode are each greater than 0.1 grams-force per millimeter.

9. The stretchable battery of claim 7, wherein the separator comprises a porous composite nanofiber film disposed on a support.

10. The stretchable battery of claim 9, wherein the porous composite nanofiber film has a fibrous form with a uniform average diameter from about 0.1 micrometer to about 3 micrometers.

11. The stretchable battery of claim 9, wherein the porous composite nanofiber film comprises at least two polymers and comprises polyurethane, polyether urethane, polyvinylidene fluoride, polyvinyl chloride, polyacrylonitrile, polyamide, polyimide, polyamideimide, polyether ketone, polyethylene terephthalate, polytrimethylene terephthalate polyethylene oxide, polypropylene oxide, polystyrene, polysulfone, polyester sulfone, polyetherimide, cellulose acetate, cellulose acetate butyrate, cellulose acetate propionate, polytetrafluoroethylene, polyethylene glycol dialkyl ether, polyethylene glycol dialkyl ester, polyvinyl acetate, poly (vinylpyrrolidone-vinyl acetate), polymethyl methacrylate, or a combination thereof.

12. The stretchable battery of claim 7, wherein the separator comprises a porous polyurethane/polyvinylidene fluoride composite nanofiber film.

13. The stretchable battery of claim 1, wherein the battery further comprises a liquid electrolyte.

14. The stretchable battery of claim 13, wherein the liquid electrolyte comprises a lithium salt and an organic solvent.

15. The stretchable battery of claim 1, wherein the battery has an elongation of greater than 1% to 70% at 25° C.

16. A method of manufacturing a stretchable battery, the method comprising:
   electrospinning a porous composite nanofiber on a support to prepare a separator;
   disposing the separator between a cathode and an anode;
   roll-pressing the cathode, the anode, and the separator to manufacture an electrode assembly;
   disposing the electrode assembly in a pouch comprising a metal barrier;
   sealing the pouch except for an electrolyte injection portion to manufacture a flat battery;
   placing the manufactured flat battery in a mold; and
   molding the flat battery into a wavy shape having peaks and valleys to manufacture the stretchable battery,
   wherein the pouch has a wavy shape comprising a plurality of peaks and a plurality of valleys and the electrode assembly has a wavy shape comprising a plurality of peaks and a plurality of valleys, and
   further comprising an elastomer, wherein the elastomer is disposed in and fills a valley of the plurality of valleys of the pouch.

17. The method of claim 16, wherein the porous composite nanofiber comprises at least two polymers and comprises polyurethane, polyether urethane, polyvinylidene fluoride, polyvinyl chloride, polyacrylonitrile, polyamide, polyimide, polyamideimide, polyether ketone, polyethylene terephthalate, polytrimethylene terephthalate, polyethylene oxide, polypropylene oxide, polystyrene, polysulfone, polyestersulfone, polyetherimide, cellulose acetate, cellulose acetate butyrate, cellulose acetate propionate, polytetrafluoroethylene, polyethylene glycol dialkyl ether, polyethylene glycol dialkyl ester, polyvinyl acetate, poly(vinylpyrrolidone-vinyl acetate), polymethyl methacrylate, or a combination thereof.

18. The method of claim 17, wherein the porous composite nanofiber is provided in a form of a mixture of a solvent and the porous composite nanofiber, and wherein an amount of the porous composite nanofiber in the mixture is from about 10 parts by weight to about 70 parts by weight, based on 100 parts by weight of the solvent of the mixture.

19. The method of claim 16, wherein the roll-pressing comprises hot rolling at a temperature from about 40° C. to about 90° C.

20. The method of claim 16, further comprising injecting a liquid electrolyte into the electrolyte injection portion after the molding of the battery into the wavy shape having peaks and valleys.

21. The method of claim 16, further comprising coating a polymer on a surface of the pouch after manufacturing the stretchable battery to form a polymer layer on a surface of the pouch.

22. The method of claim 21, wherein the polymer comprises polyvinyl alcohol, polyethylene, polypropylene, urethane, polyethylene terephthalate, polyimide, nylon, or a combination thereof.

23. The method of claim 21, further comprising, after forming the polymer layer, filling the valley of the pouch with the elastomer, and
curing the elastomer.

24. The method of claim 23, wherein the elastomer comprises polydimethylsiloxane, polyphenylmethylsiloxane, hexamethyldisiloxane, or a combination thereof.

* * * * *